United States Patent
Bruck et al.

(10) Patent No.: US 6,677,927 B1
(45) Date of Patent: Jan. 13, 2004

(54) X-Y NAVIGATION INPUT DEVICE

(75) Inventors: Jonathan S. Bruck, Tampa, FL (US);
Aditha M. Adams, Seattle, WA (US);
Melissa S. Jacobson, Seattle, WA (US);
Steven T. Kaneko, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/378,866

(22) Filed: Aug. 23, 1999

(51) Int. Cl.[7] .................................................. G09G 5/00
(52) U.S. Cl. ........................................ 345/156; 345/168
(58) Field of Search ................................ 345/168, 173, 345/156, 157, 160, 167; 178/18.01

(56) References Cited

U.S. PATENT DOCUMENTS

| | | | | |
|---|---|---|---|---|
| 4,736,191 A | * | 4/1988 | Matzke et al. ............... 340/365 |
| D357,011 S | | 4/1995 | Paull et al. .................. D14/115 |
| D357,476 S | | 4/1995 | Paull et al. .................. D14/115 |
| 5,508,719 A | * | 4/1996 | Gervais ....................... 345/157 |
| 5,608,863 A | * | 3/1997 | Ishizawa et al. ............. 395/501 |
| 5,717,431 A | * | 2/1998 | Chia-Ying et al. ........... 345/168 |
| 5,808,922 A | * | 9/1998 | Martinez et al. ............. 708/141 |
| 5,841,425 A | * | 11/1998 | Zenz, Sr. ..................... 345/158 |
| 5,949,643 A | * | 9/1999 | Batio .......................... 361/681 |
| 5,959,614 A | * | 9/1999 | Ho ............................. 345/167 |
| 6,005,496 A | * | 12/1999 | Hargreaves et al. .......... 341/22 |
| 6,040,977 A | * | 3/2000 | Hoffer ......................... 361/680 |
| 6,043,809 A | | 3/2000 | Holehan ...................... 345/168 |
| 6,046,728 A | * | 4/2000 | Hume et al. ................. 345/157 |
| 6,055,153 A | * | 4/2000 | Chiu et al. ................... 361/680 |
| 6,081,207 A | * | 6/2000 | Batio .......................... 341/20 |
| 6,084,569 A | * | 7/2000 | Ricotta et al. ............... 345/156 |
| 6,084,576 A | * | 7/2000 | Leu et al. ..................... 341/22 |
| 6,096,984 A | * | 8/2000 | Howell et al. ............. 178/18.01 |
| 6,188,390 B1 | * | 2/2001 | Selker et al. ................ 345/168 |
| 6,256,018 B1 | * | 7/2001 | Zarek .......................... 315/168 |
| 6,323,845 B1 | * | 11/2001 | Robbins ...................... 345/168 |
| 6,344,967 B2 | * | 2/2002 | Zamora et al. .............. 345/168 |

* cited by examiner

*Primary Examiner*—Amare Mengistu
*Assistant Examiner*—Nitin Patel
(74) *Attorney, Agent, or Firm*—Westman, Champlin & Kelly

(57) ABSTRACT

A navigation input device for navigating a graphical display includes a substantially elliptical sensing window and a touch sensor, which is sensitive to placement of a user's digit within the sensing window.

28 Claims, 10 Drawing Sheets ed in FIG. 1.

X-Y NAVIGATION INPUT DEVICE

BACKGROUND OF THE INVENTION

The present invention relates to computerized systems. In particular, the present invention relates to input devices for computerized systems.

Computerized systems receive input signals from input devices such as keyboards, mice, joysticks, game pads, touchpads, track balls and scrolling wheels. These input devices create input signals using touch sensors, transducers or switches. Mice, track balls and touchpads are graphical X-Y navigation devices, which are typically used to control the X-Y position and movement of a cursor on a display screen.

It is desirable for X-Y navigation devices to have the highest possible performance in terms of target acquisition speed and accuracy. Target acquisition speed is measured in terms of how quickly a user can move the cursor to a desired target on the display screen. Accuracy is measured in terms of how precisely the user can aim and hit the target without errors. The inventors of the present application have found that users have optimal target acquisition speed and accuracy through the use of a desktop mouse as opposed to other traditional navigation devices, such as touchpads and track balls. This is partly due to a more comfortable hand position that is achieved when using a desktop mouse as compared to other traditional navigation devices. Comfort can be viewed in terms of user perception and actual hand and forearm muscle stress and/or strain experienced when using a device. However, it has also been found that the use of a desktop mouse in conjunction with a keyboard of a laptop or desktop computer often requires the user to move one hand repeatedly back and forth between the keyboard and the mouse. To limit these hand movements, there has been an effort to integrate X-Y navigation devices into keyboards, particularly in laptop and notebook computers. Due to the small form factors of laptop and notebook computers and the inherent limitations of traditional integrated pointing devices, it has been difficult to achieve the same target acquisition speed and accuracy with integrated pointing devices as is achieved with desktop mice. Also, these devices are often positioned in areas of the keyboard that are difficult to reach or uncomfortable to operate. This further reduces target acquisition speed and accuracy.

Improved pointing devices and keyboard layouts are desired which provide optimal target acquisition speed and accuracy in integrated and stand-along environments.

SUMMARY OF THE INVENTION

One aspect of the present invention relates to a navigation input device for navigating a graphical display. The input device includes a substantially elliptical sensing window and a touch sensor, which is sensitive to placement of a user's digit within the sensing window.

Another aspect of the present invention relates to a keyboard including first and second keybanks, which are laterally separated from one another and have upper and lower keybank boundaries. A central area is located between the first and second keybanks. A touchpad navigation device is positioned within the central area, between the upper and lower keybanks boundaries.

In one embodiment, a scrolling wheel is positioned within the central area, between the touchpad navigation device and the upper keybank boundary. The scrolling wheel is laterally offset toward one of the first and second keybanks relative to a center of the touchpad navigation device. A depressible switch is positioned within the central area between the scrolling wheel and the other of the first and second keybanks.

The touchpad navigation device has a sensing window with a substantially elliptical perimeter and has a touch sensor, which is sensitive to placement of a user's digit within the sensing window. In another embodiment, the touchpad navigation device includes a sensing window having a substantially rectangular perimeter.

Another aspect of the present invention relates to a keyboard including first and second keybanks, which are laterally separated from one another and have upper and lower keybank boundaries. A central area is located between the first and second keybanks. An X-Y navigation device is positioned within the central area, between the upper and lower keybank boundaries. A scrolling wheel is positioned within the central area, between the X-Y navigation device and the upper keybank boundary.

In one embodiment, the X-Y navigation device includes a touchpad. In another embodiment, the X-Y navigation device includes a track ball.

DETAILED DESCRIPTION OF ILLUSTRATIVE EMBODIMENTS

Figure 1:
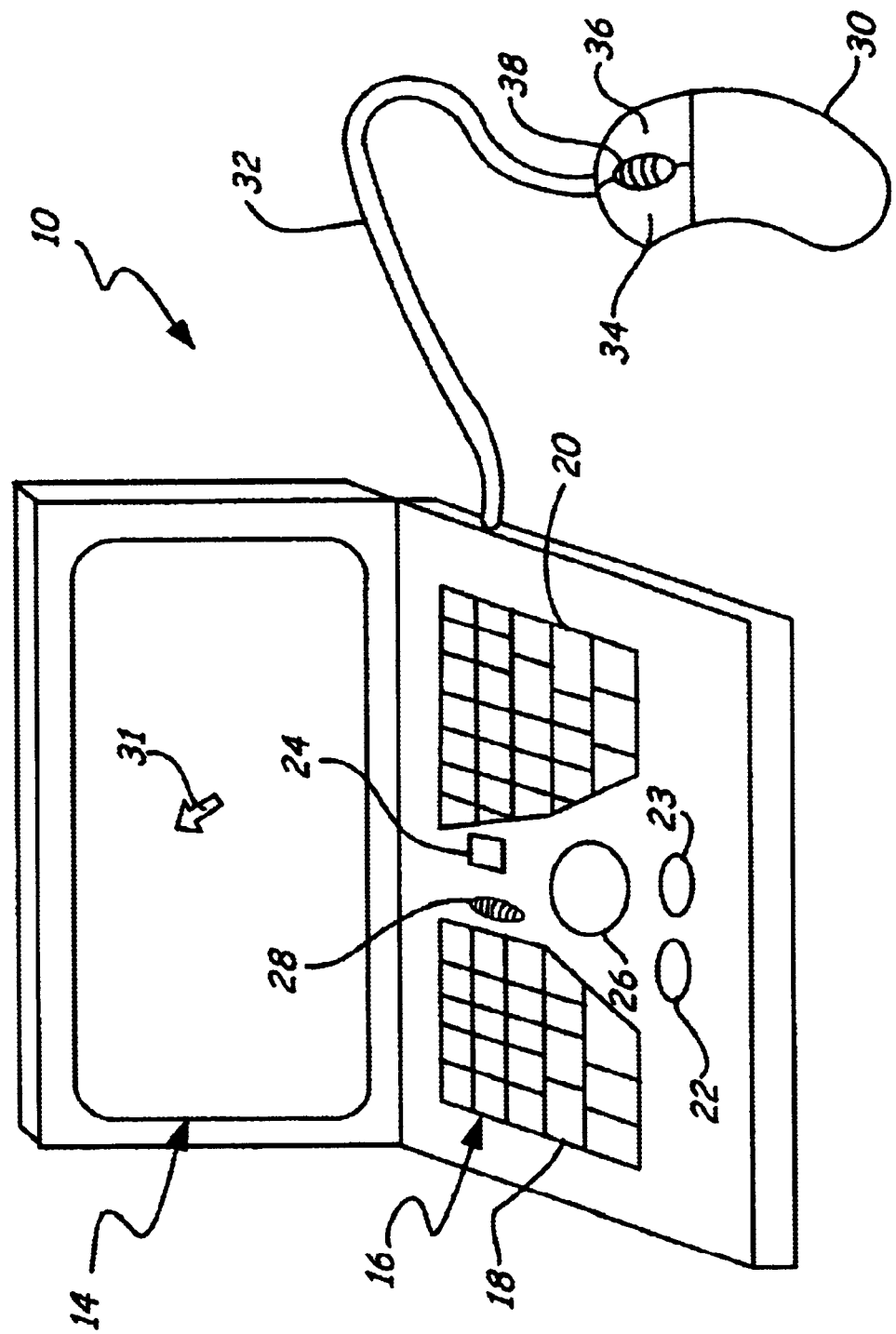
FIG. 1 is a perspective view of a laptop or notebook computer having a variety of input devices in accordance with one embodiment of the present invention.

FIG. 1 is a perspective view of a laptop or notebook computer having a variety of input devices in accordance with one embodiment of the present invention. Computer 10 includes an electronics housing 12, a graphical display 14, a keyboard 16 having a pair of split keybanks 18 and 20, depressible switches or "buttons" 22, 23 and 24, a touchpad X-Y navigation device 26, an encoder scrolling wheel 28, and a mouse 30. These input devices allow a user to input data into computer 10 or control movement of a cursor 31 on display screen 14.

Those skilled in the art will recognize that different input devices provide different input signals depending upon the types of switches or sensors in the input device. The switches in buttons 22, 23 and 24 and the keys in keybanks 18 and 20 provide signals indicative of a switch opening or closing. Computer 10 has one or more microcontrollers (not shown) which sense a change in state in any of the switches. For example, the microcontroller may use a multiplexer to sequentially test the state of each switch on the keyboard to determine if any of the switches have been pressed. The techniques used to detect these switch closures are well known in the keyboard art.

Scrolling wheel 28 and mouse 30 include one or more encoder wheels which provide signals indicative of the motion of wheel 28 or a ball (not shown) in mouse 30. Mice typically have one encoder wheel for tracking movement in the X direction and another encoding wheel to track movement in the Y direction. Movement in the X and Y directions are detected by mouse 30 and passed to computer 10 over cable 32. Movement data is typically in the form of mouse packets, which describe the current state of any switches on mouse 30 as well as the distances that the mouse ball in mouse 30 has moved in the X and Y directions since the last mouse packet was sent. In some mice, the X and Y movements are tracked by a separate optics microcontroller, which uses optical data to determine movement of the mouse relative to the tabletop. The optical microcontroller converts this optical data into movement values that are transmitted over cable 32.

In the embodiment shown in FIG. 1, mouse 30 further includes a pair of depressible switches 34 and 36 and a scrolling wheel 38. An example of such a mouse is commercially available under the trademark IntelliMouse® Pro from Microsoft Corporation.

Touchpad X-Y navigation device 26 has a touch sensor which generates electrical signals based on actual contact between the user and a portion of the sensor or based on proximity between the user and the sensor. Touch sensors that rely on contact are referred to as contact sensors, and touch sensors that rely on proximity are referred to as proximity sensors. The context of this application, the touch sensor in touchpad 26 is touched when it is contacted in the case of a contact sensor or when the user is sufficiently proximate the sensor in the case of a proximity sensor. Touchpad 26 is actuated by touching the surface of the touchpad with a digit of the user or by making relative movements of the digit along the touchpad. These movements are sensed by an array of touch sensors and translated into digital signals which are used to control the X and Y position of cursor 31 on display screen 14.

It has been found that users have traditionally achieved optimal target acquisition speed and accuracy within display screen 14 through a desktop mouse, such as mouse 30, as opposed to other types of X-Y navigation devices. However, the use of mouse 30 often requires the user to move one hand back and forth repeatedly between keyboard 16 and mouse 30. Also, mouse 30 may not always be available in portable environments.

To limit these hand movements, touchpad 26 is integrated into keyboard 16 of computer 10, together with scrolling wheel 28 and buttons 22, 23 and 24. The layout of these input devices, relative to keybanks 18 and 20, allow the user to operate the devices with relatively neutral hand positions that minimize fatigue experienced by the user. Integration of an X-Y navigation device between keybanks 18 and 20 also reduces shoulder flexion/abduction as compared to the use of an external mouse. In addition, touchpad 26 has an elliptical (e.g. circular) sensing window, which can provide the user with a high target acquisition speed and accuracy relative to touchpads of the prior art. As discussed in more detail below, with a circular sensing window, the user has greater control over cursor movement on the screen. Therefore, the software driver for touchpad 26 can be optimized as desired to provide the user with increased sensitivity (i.e. greater cursor movement for a given digit movement on the touchpad). Also, the diameter of touchpad 26 can be reduced, as compared to a typical touchpad, to allow the touchpad to be conveniently located between split key banks 18 and 20, as opposed to a more inconvenient and less comfortable location below the key banks.

Figure 2A:
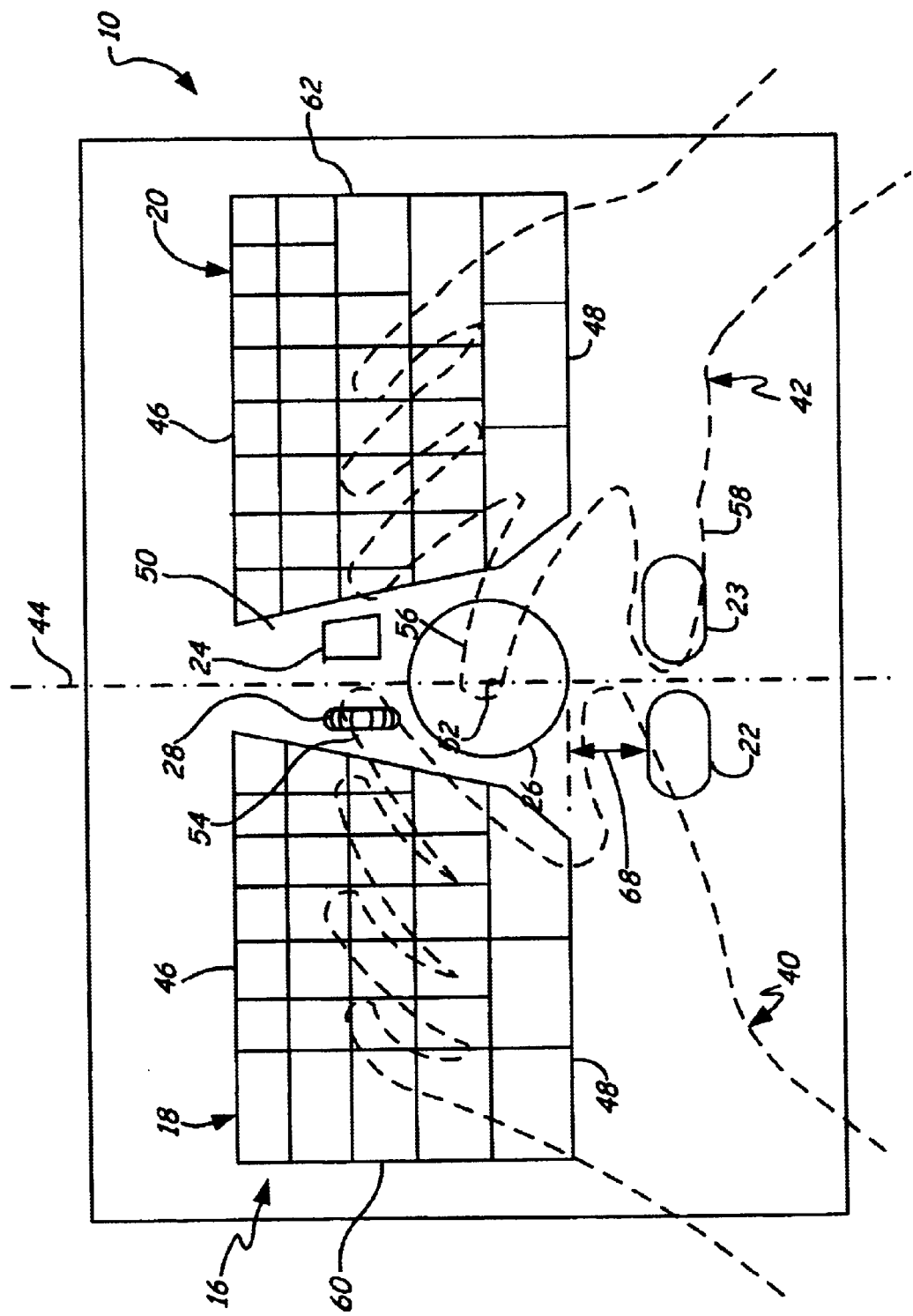
FIG. 2A is a top plan view of a keyboard of the computer shown in FIG. 1.

FIG. 2A is a top plan view of the base of computer 10 showing the layout of keyboard 16 in greater detail. A user's left hand 40 and right hand 42 are shown in phantom in a biomechanically neutral position. Keybanks 18 and 20 are laterally separated from one another relative to a central reference line 44 and have upper and lower keybank boundaries 46 and 48, respectively. This defines a central area 50 between keybanks 18 and 20, which lies below upper keybank boundary 46 and above lower keybank boundary 48. Central reference line 44 extends through central area 50, equidistant between the first and second keybanks 18 and 20.

Touchpad 26 is positioned within central area 50, between upper keybank boundary 46 and lower keybank boundary 48. Scrolling wheel 28 is also positioned within central area 50, between touchpad 26 and upper keybank boundary 46. In the embodiment shown in FIG. 2A, touchpad 26 is centered along central reference line 44 to allow the user to actuate the touchpad with a digit, such as an index finger 54 or 56, from either left hand 40 or right hand 42. Other relative positions are also possible. Since touchpad 26 is the primary X-Y navigation device on keyboard 16, users will typically use the index finger of their dominant hand to actuate touchpad 26. This hand is most often right hand 42.

The center of button 24 is located a maximum of 4 centimeters (or about two keyboard rows) from the center of touchpad 26, in the embodiment shown in FIG. 2A. This relative spacing ensures a natural and comfortable reach for a range of finger/hand positions for a target population having a hand size falling within the range of a 5th percentile female to 95th percentile male North American adult. Button 24 is laterally offset toward keybank 20 relative to central reference line 44 and center 52 of touchpad 26. If desired, button 24 can be programmed to operate in the same manner as the right select switch on a traditional mouse.

Scrolling wheel 28 is laterally offset toward keybank 18 relative to central reference line 44 and a center 52 of touchpad 26. This positions scrolling wheel 28 closer to a more neutral and convenient position for index finger 54 of the less dominant, left hand 40 for most users. However, scrolling wheel 28 can be centered along central reference line 44 or offset toward keybank 20, and button 24 can be eliminated in alternative embodiments. Similar to button 24, the center of scrolling wheel 28 is located a maximum of 4 centimeters (or about two keyboard rows) from the center of touchpad 26.

Touchpad 26 is positioned relative to keybanks 18 and 20 to reduce hand motion and change in wrist posture. Touchpad 26 is positioned to allow the middle, ring and small fingers the user's hand 40 or 42 to rest on the keys in either keybank 18 or keybank 20 while the user's index finger 54 or 56 is in contact with center 52 of touchpad 26. This allows the user to rest the middle, ring and small fingers instead of statically extending them. In one embodiment, touchpad 26 is positioned relative to at least one of the keybanks 18 and 20 such that a user's hand 40 or 42, having a size falling within a range of a 5th percentile female to a 95th percentile male of North American adults, is within a biomechanically neutral range of positions when the distal phalange of the index finger of the hand is touching center 52 of touchpad 26 and the distal phalange of the middle finger is resting on one of the keys in keybank 20. In the biomechanically neutral range of positions, the user's fingertips are typically oriented along home rows 60 and 62 of keybanks 18 and 20, respectively. The home rows are typically defined as the middle rows in keybanks 18 and 20.

Touchpad 26 can have a diameter of 3–5 cm, for example. This dimension is based on the center-to-center distance between the distal phalanges of the index finger and middle finger when the hand is in the relaxed position for the range of 5th percentile female to 95th percentile male North American adults. Other diameters can also be used. With this diameter, the user's adjacent fingers can comfortably rest on the edge of touchpad 26 or on one or more of the keys on keybanks 18 or 20 in a biomechanically neutral range of positions for the target population. Larger diameters can also be used, but may require the user to enter into a less neutral position of one or more adjacent fingers to avoid any undesired actuation of the touchpad.

Buttons 22 and 23 are positioned about central reference line 44, below lower keybank boundary 48. Buttons 22 and 23 are separated from touchpad 26 by a distance 68, which is approximately 6–8 cm to accommodate a natural relaxed posture when using touchpad 26 with index finger 56 and buttons 22 and 23 with thumb 58, based on a natural arc range of motion for the thumb for the target population (5th percentile female/95th percentile male). This distance is estimated using a thumb length of 10 cm and an angle between thumb 58 and index finger 56 of 40 degrees and assuming a 90-degree angle between the thumb length and separation distance 68. This separation distance reduces static thumb flexion and adduction postures at the MPC joint as compared to keyboards in which the buttons are laterally adjacent to a touchpad.

Buttons 22 and 23 are located adjacent each other in a laterally spaced orientation to accommodate thumb MP flexion in the range of 50 degrees to 60 degrees and thumb IP flexion in the range of 50 degrees to 70 degrees, as described in Hume et al., *The Clinical Measurement of Joint Motion*, p. 59 (1990). In the embodiment shown in FIG. 2A, the centers of buttons 22 and 23 are laterally offset from and positioned below the center of touchpad 26, relative to central reference line 44, by a maximum of 8 centimeters (which is the approximate thumb length for a hand size of a 95th percentile male). The above-locations can also be applied to a trackball in the left button position (button 22) and to a trackball in the touchpad position.

Figure 2B:
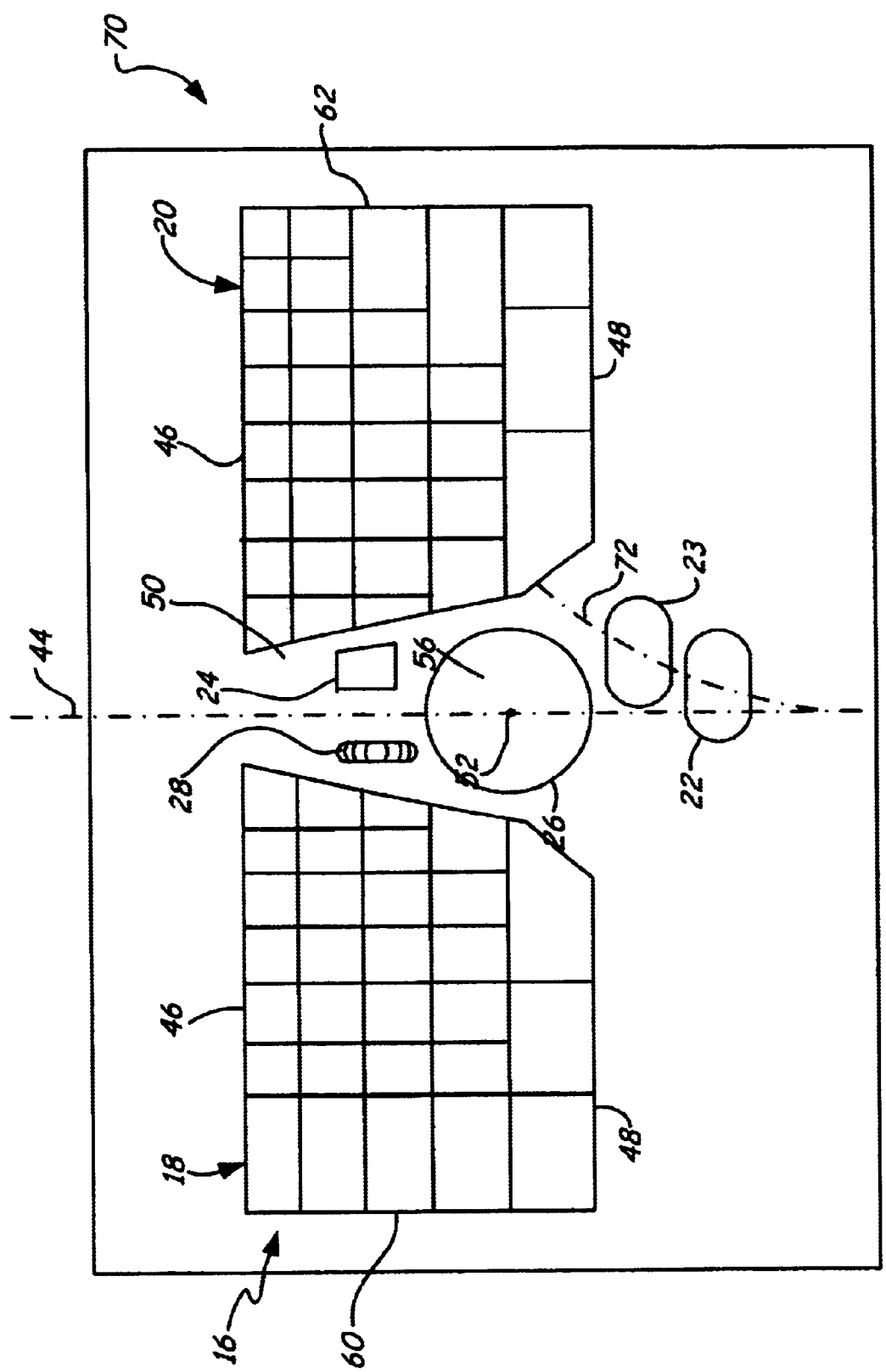
FIG. 2B is a top plan view of an alternative keyboard having switch buttons positioned along a natural arc of the user's thumb.

Buttons 22 and 23 can be placed in other locations on keyboard 16. For example, FIG. 2B is a top plan view of a keyboard 70 in which buttons 22 and 23 are positioned such that they lie in a natural arc of the user's thumb. The same reference numerals are used in FIG. 2B as were used in FIG. 2A for the same or similar elements. When the user's index finger 56 (shown in FIG. 2A) is positioned at center 52 of touchpad 26, the user's thumb 58 (also shown in FIG. 2A) moves along arc 72. In this embodiment, buttons 22 and 23 are positioned along arc 72.

Figure 3:
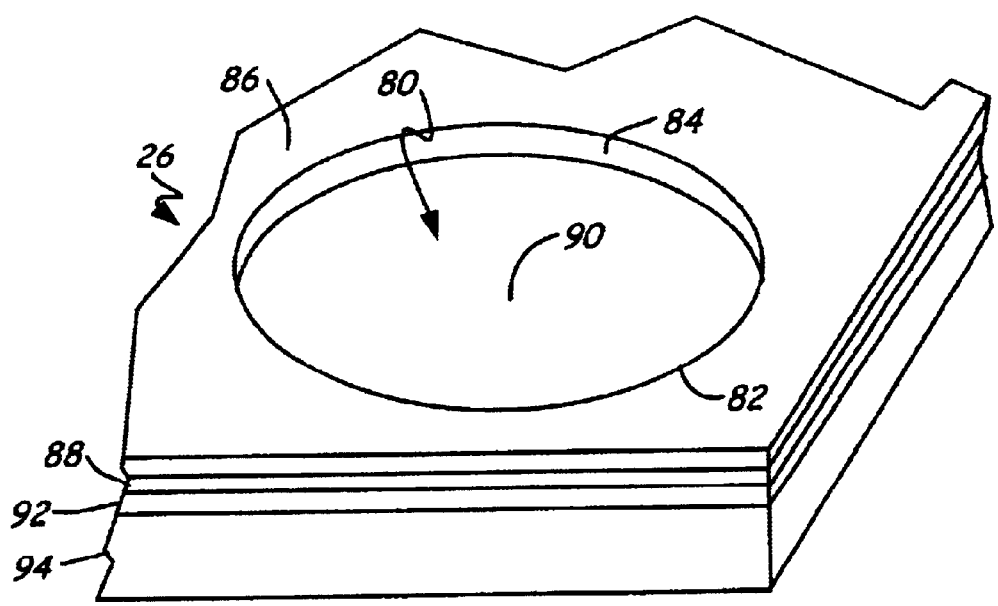
FIG. 3 is a fragmentary, perspective view showing a touchpad on the keyboards shown in FIGS. 2A and 2B in greater detail.

As mentioned above, another advantage of the embodiments shown in FIGS. 1, 2A and 2B is that touchpad 26 has a substantially elliptical sensing window. FIG. 3 is a fragmentary, perspective view showing the touchpad 26 in greater detail. Touchpad 26 has an elliptical (e.g. circular) sensing window 80, which is defined by perimeter 82. Perimeter 82 is defined by a raised shoulder 84 which can be formed as a cut out in the top case 86 of keyboard 16, for example. A dielectric membrane 88, such as rubber or plastic, is positioned beneath top case 86, behind window 80. Membrane 88 provides a durable surface on which the user can contact touchpad 26. A touch sensor layer 92 is positioned beneath membrane 88 for sensing contact or proximity of the user's digit.

As mentioned above, several well-known technologies can be used for sensing contact or proximity. These technologies include conductive films for sensing changes in capacitance, capacitive pressure sensors, photodiodes and piezoelectric materials, for example. In one embodiment, sensor layer 92 includes a conductive film available from ChemTronics, which has a capacitance that changes when it is touched. In this embodiment, touchpad 26 also includes a capacitive measuring circuit, which generates an electrical signal based on the change in capacitance of the conductive film.

In another embodiment, layer 92 includes a sensor array which uses reflected light from an array of LEDs to detect when the user is proximate to a particular grid in the sensor array. An integrated circuit in layer 94, for example, drives the LED and senses the reflected light. An example of such a sensor array is available from Hamamatsu Corporation of Bridgewater, N.J. In other embodiments, touchpad 26 can include an optical lens/camera, such as that found in the optical mice disclosed in U.S. application Ser. No. 09/036,809, filed Mar. 9, 1998 and entitled "OPERATOR INPUT DEVICE", U.S. application Ser. No. 09/217,403, filed Dec. 21, 1998 and entitled "IMAGE SENSING OPERATOR INPUT DEVICE", and U.S. application Ser. No. 09/273,899, filed Mar. 22, 1999 and entitled "OPTICAL COUPLING ASSEMBLY FOR IMAGE SENSING OPERATOR INPUT DEVICE", which are hereby incorporated by reference. In these embodiments, the optical lens of the mouse would be inverted so that the focal plane of the lens would correspond to a reference plane of the touchpad sensor, as opposed to a tabletop. Other proximity sensor embodiments use changes in electric or magnetic fields near the touchpad to determine when the user is proximate to the touchpad. Those skilled in the art will recognize that these and other contact or proximity sensor technologies can be used within the context of the present invention. In a further embodiment, touchpad 26 can also be depressible to allow actuation of a switch embedded in touchpad 26 for performing selection or activation operations.

Touchpads of the prior art have had substantially rectangular sensing windows. It has been found that users can achieve better navigation performance with a substantially non-rectangular, elliptical sensing window 80 as compared to a rectangular sensing window. Navigation performance can be measured in terms of target acquisition speed and accuracy. Target acquisition speed is a measure of how quickly a user can move the cursor to a target position on the display. Accuracy is a measure of how precisely the user can aim the cursor and hit the target without error. Also, the layout of the keyboard shown in FIGS. 1, 2A and 2B further increases target acquisition speed by allowing "point and click" operations to be performed with very small finger and thumb movements. By spreading the thumb and forefinger, the user can control cursor position with the index finger through touchpad 26 while making a selection by actuating button 22 or 23 with the thumb.

Rectangular touchpads of the prior art reflect the rectangular shape of the display screen. However, it has been found that with a circular or otherwise elliptical sensing window 80, users can more easily locate the center of the touchpad with their finger relative to perimeter 82 without looking at the touchpad. Fingers naturally move in circles, not in rectangles. With a circular sensing window, when the user's finger contacts perimeter 82, the finger is naturally led back to the center of the touchpad. The user therefore does not easily lose the location of their finger relative to perimeter 82 as compared to a rectangular touchpad.

Figure 4:
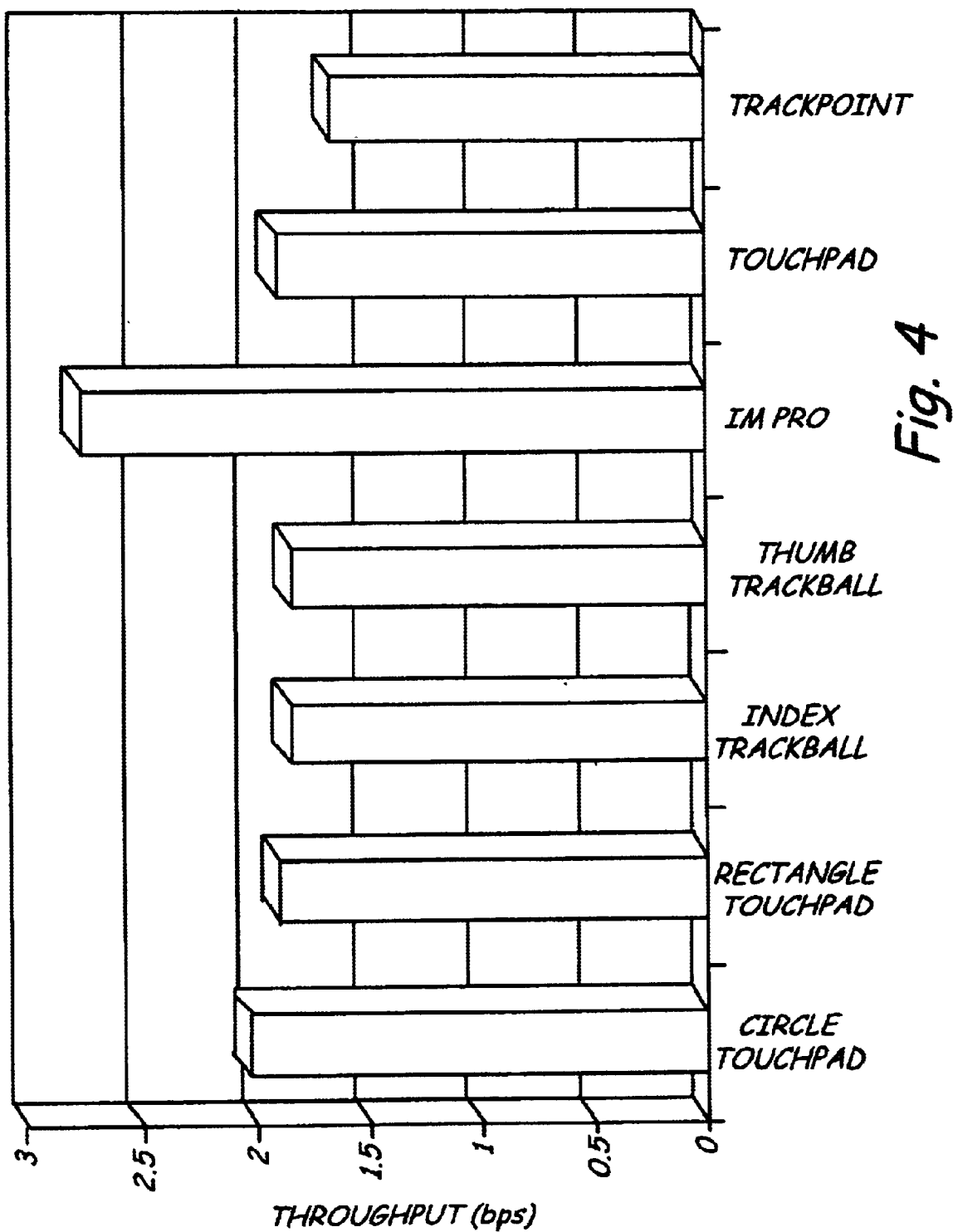
FIG. 4 is a chart illustrating throughput in bits per second for various navigation devices.
Figure 5:
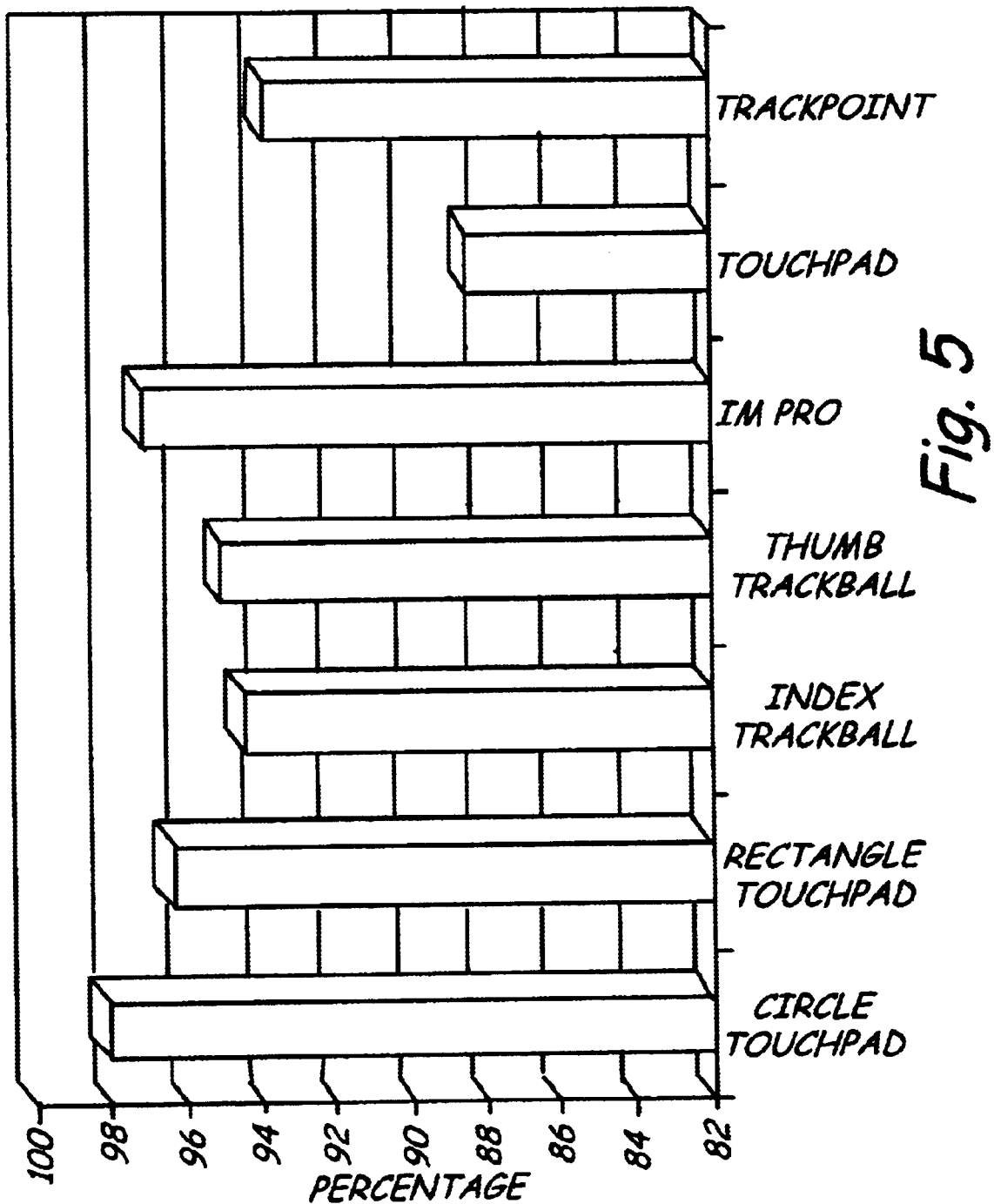
FIG. 5 is a graph illustrating accuracy percentages achieved with the various navigation devices.

FIGS. 4–5 show test results of navigational performance for various X-Y navigation devices, including a circular touchpad (a modified Synaptics, Inc. TM41P1J220-2 SJA33-41 which was inlaid in a circular aperture and had a software driver optimized for a circular sensing window), a Gateway Solo 9000 rectangular touchpad, an index track ball, a thumb track ball, the Microsoft IntelliMouse® (IM) Pro desktop mouse, A Synaptic Sub-Mini Touchpad using Synaptic Driver 5.0, with the speed set to 1 and the tap to click feature disabled, and an IMB Trackpoint Version 3.

FIG. 4 is a chart illustrating throughput in bits per second (bps). Throughput, in bits/second, is the human rate of information processing for movement tasks such as pointing and dragging with a computer input device. I. S. MacKenzie, A. Sellen, and W. Buxton, *A Comparison of Input Devices in Elemental Pointing and Dragging Tasks,* Proceedings of the CHI'91 Conference on Human Factors in Computing Systems, pp. 161–166 (1991). The throughput of the circular touchpad outperformed all of the other X-Y navigation devices tested except for the Microsoft IM Pro desktop mouse. This indicates that, on average, the users were able to process information to perform the tasks faster with the circular touchpad than the other X-Y navigation devices with the exception of the Microsoft IM Pro desktop mouse.

FIG. 5 is a graph illustrating the accuracy percentages achieved for each of the X-Y navigation devices that were tested. The user was able to achieve a greater accuracy percentage with the circular touchpad as compared to any of the other X-Y devices that were tested, including the desktop mouse.

Figure 6:
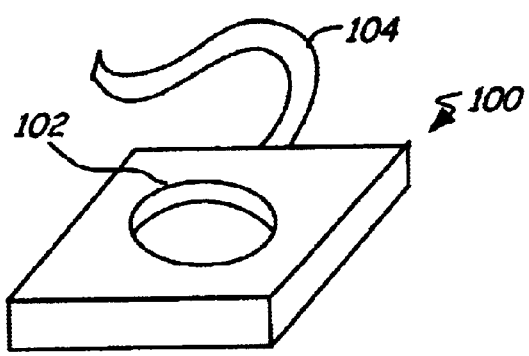
FIG. 6 is perspective view of a stand-alone navigation device having an elliptical touchpad, according to one embodiment of the present invention.
Figure 7:
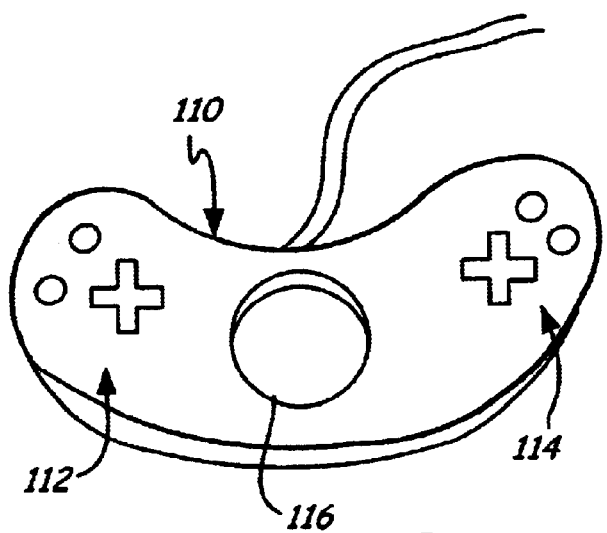
FIG. 7 is a perspective view of a game pad having an elliptical touchpad according to one embodiment of the present invention.

A circular or otherwise elliptical touchpad can be used in a variety of applications, in addition to a laptop or notebook computer keyboard as shown in FIGS. 1, 2A and 2B. For example, FIG. 6 is perspective view of a stand-alone X-Y navigation device 100 having an elliptical touchpad 102. Electrical signals generated by touchpad 102 are transmitted to an external device through cable 104, as is well known in the art. FIG. 7 is a perspective view of a game pad 110 having a plurality of switches and controls 112 and 114 and an elliptical touchpad 116.

Figure 8:
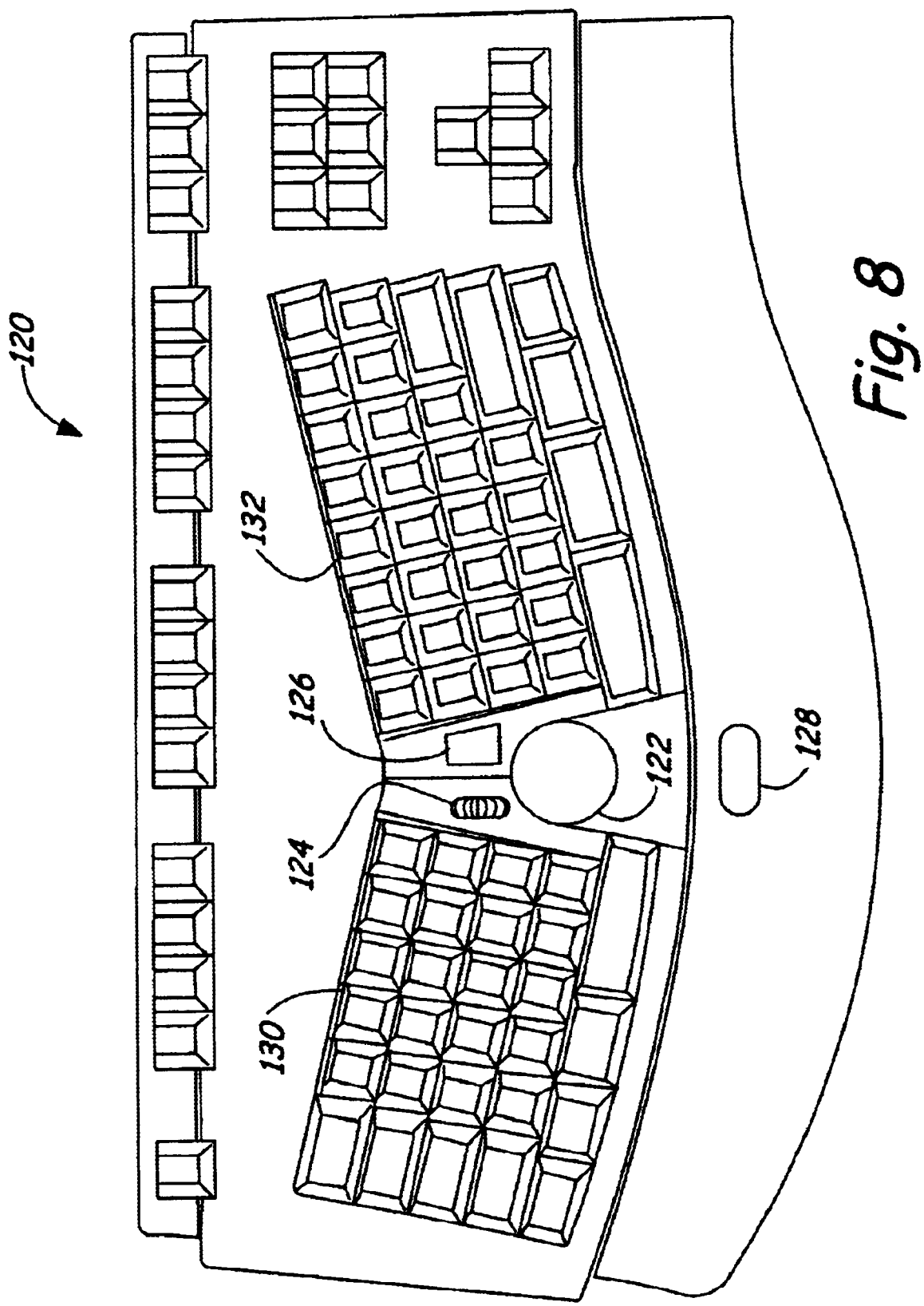
FIG. 8 is a top plan view of a stand-alone ergonomic keyboard having an elliptical touchpad.

FIG. 8 is a top plan view of a stand-alone ergonomic keyboard 120 for a desktop computer or other data entry or control system. Keyboard 120 includes an elliptical touchpad 120, a scrolling wheel 122 and a depressible switch button 126, which are positioned in a central area between a pair of split keybanks 130 and 132. In one embodiment, keybanks 130 and 132 include a plurality of alphanumeric keys and selected function keys. Keyboard 120 also includes a further depressible switch button 128 positioned below touchpad 122.

Figure 9:
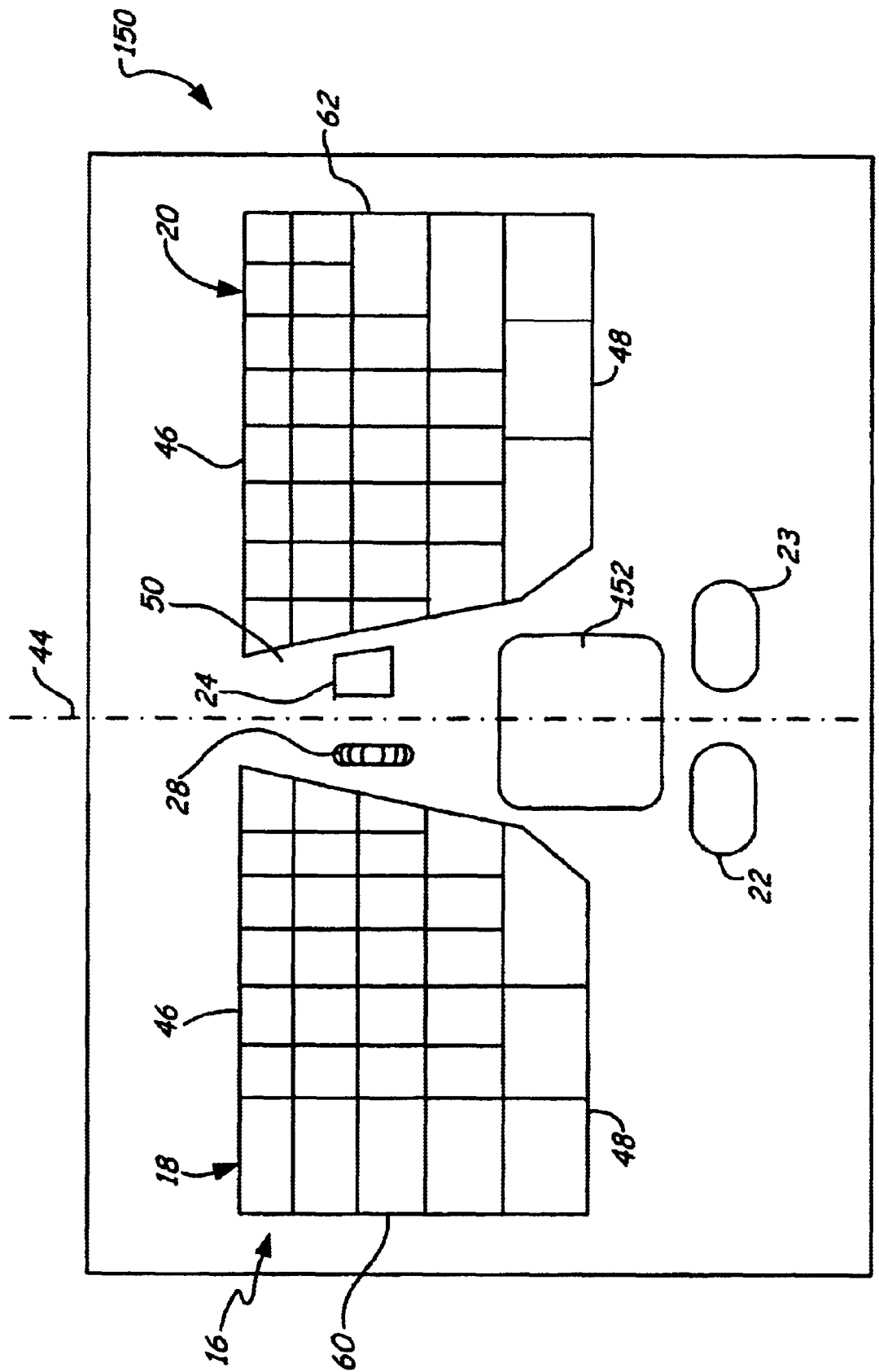
FIG. 9 is a top plan view a laptop or notebook computer keyboard which includes a rectangular touchpad according to an alternative embodiment of the present invention.

FIG. 9 is a top plan view a laptop or notebook computer keyboard 150 which is similar to that shown in FIGS. 2A and 2B, but includes a rectangular touchpad 152 according to an alternative embodiment of the present invention. The same reference numerals are used in FIG. 9 as were used in FIGS. 2A and 2B for the same or similar elements. As in the embodiments shown in FIGS. 2A and 2B, keyboard 150 also has a scrolling wheel 28 and a depressible switch button 24, which are positioned with touchpad 152 in a central area 50, between a pair of split keybanks 18 and 20. Touchpad 152 is centered along central reference line 44. Scrolling wheel 28 is offset with respect to reference line 44 and a center of touchpad 152, toward keybank 18.

Figure 10:
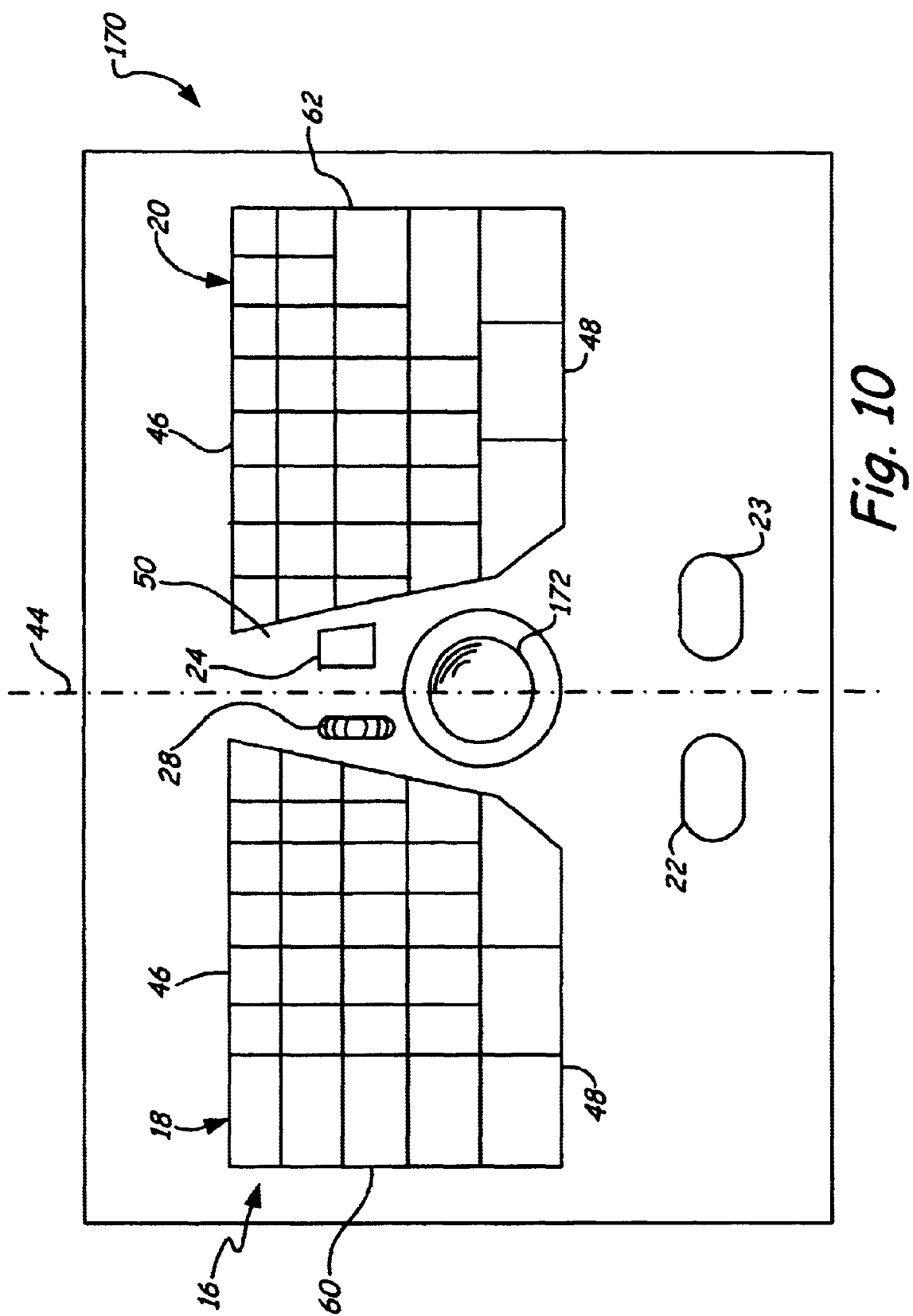
FIG. 10 is a top plan view of a keyboard having an index track ball within a central area of the keyboard according to another alternative embodiment of the present invention.

FIG. 10 is a top plan view of a keyboard 170 having an index track ball X-Y navigation device 172 positioned within central area 50, below scrolling wheel 28 and button 24, according to another alternative embodiment of the present invention. Track ball 172 has a pair of encoding wheels (not shown) which detect and encode movements of track ball 172 in the X and Y directions, as is known in the art. Once again, track ball 172 is positioned along central reference line 44 to allow the user to actuate the trackball with the user's left or right index finger. Other arrangements are also possible.

Figure 11:
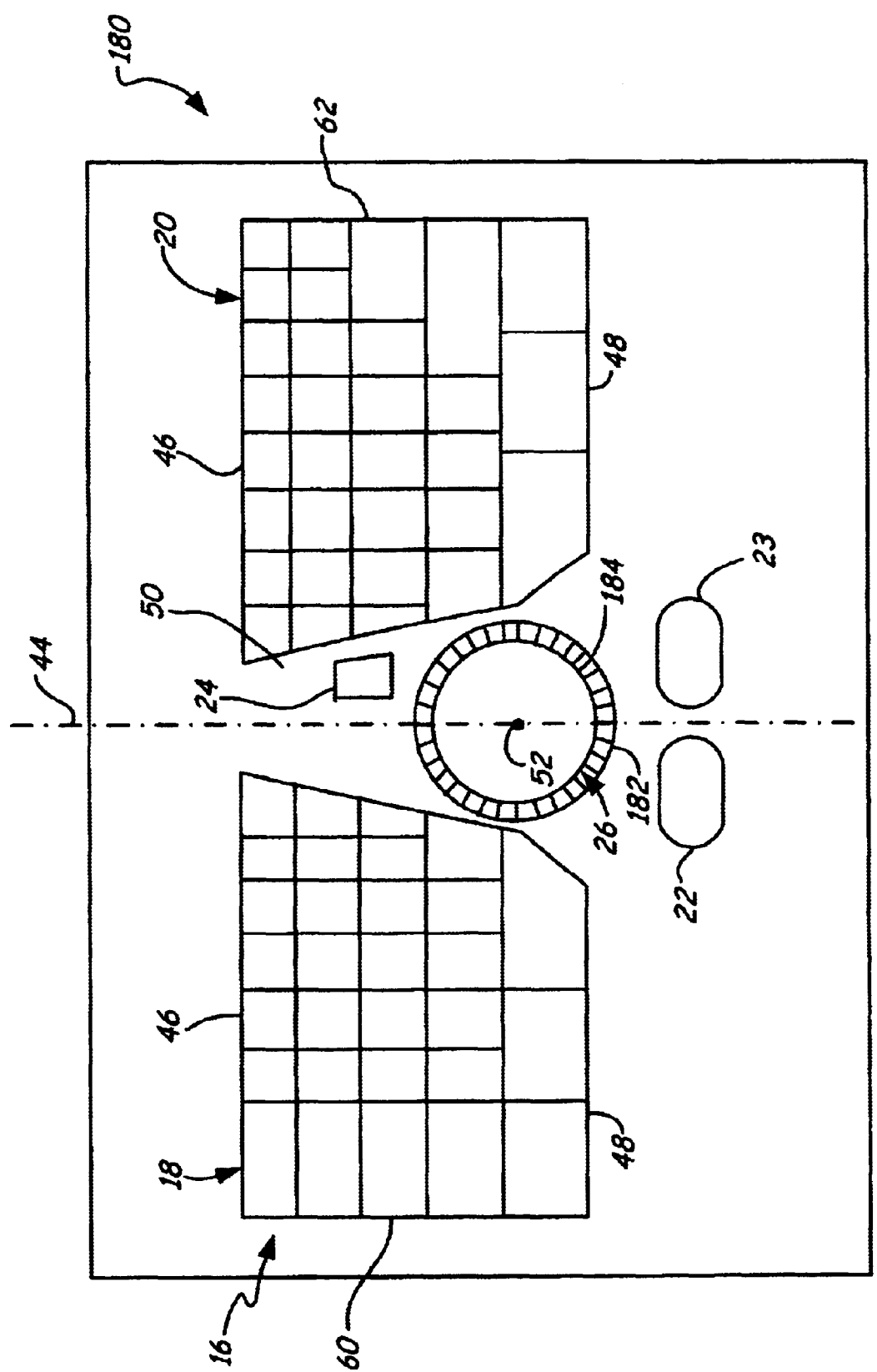
FIG. 11 is a top plan view a laptop or desktop computer keyboard in which the scrolling wheel is incorporated into the touchpad according to an alternative embodiment of the present invention.

FIG. 11 is a top plan view a laptop or desktop computer keyboard 180 in which the scrolling wheel is incorporated into touchpad 26 according to an alternative embodiment of the present invention. The same reference numerals are used in FIG. 11 as were used in FIGS. 2A and 2B, for example, for the same or similar elements. Scrolling wheel 28 of FIGS. 2A and 2B has been removed and replaced with an annular scrolling wheel or "dial" 182. Dial 182 is positioned about the perimeter of touchpad 26 and is coaxial with the touchpad. Dial 182 is rotatable about an axis of rotation that extends through center 52 of touchpad 26 in a plane generally parallel to the top surface of keyboard 180. Similar to a traditional scrolling wheel, dial 182 has an encoder wheel which provides signals indicative of rotation of dial 182 about touchpad 26. The circular nature of touchpad 26 allows the scrolling function of dial 182 to be readily mapped about the circumference of touchpad 26. Dial 182 can also be depressible for actuating a switch coupled to dial 182. A scrolling dial similar to dial 182 can be incorporated around other types of x-y pointing devices such as track balls in other alternative embodiments.

Although the present invention has been described with reference to particular embodiments, workers skilled in the art will recognize that changes may be made in form and detail without departing from the spirit and scope of the invention.

What is claimed is:

1. A navigation input device for navigating a graphical display, the input device comprising:
    a circular sensing window having a perimeter;
    an X-Y navigation touch sensor, which is sensitive to location of a user's digit within the circular sensing window relative to the perimeter; and
    an annular scrolling dial, which is coaxial with the circular sensing window and rotatable about a center of the sensing window.

2. The navigation input device of claim 1 wherein the circular sensing window has a diameter of 3–4 centimeters.

3. The navigation input device of claim 1 wherein:
    the touch sensor comprises a sensing surface within the sensing window; and
    the circular sensing window is defined by a circular, raised shoulder, which surrounds the sensing surface.

4. The navigation input device of claim 1 wherein the touch sensor comprises a proximity sensor.

5. The navigation input device of claim 1 wherein the touch sensor comprises a contact proximity sensor.

6. A keyboard comprising:
   first and second keybanks, which are laterally separated from one another and have upper and lower keybank boundaries;
   a central area between the first and second keybank boundaries;
   a touchpad navigation device, comprising:
      a sensing window having a substantially circular perimeter; and
      a touch sensor, which is sensitive to location of a user's digit relative to the sensing window,
         said touchpad navigation device being positioned within the central area, between the upper and lower keybank boundaries; and
   an annular scrolling dial, which is coaxial with the sensing window and rotatable about a center of the sensing window.

7. The keyboard of claim 6 and further comprising:
   a center reference line extending through the central area, from the lower keybank boundary toward the upper keybank boundary and equidistant between the first and second keybanks; and
   wherein the touchpad navigation device is centered along the center reference line.

8. The keyboard of claim 6 and further comprising:
   a scrolling wheel positioned within the central area, between the touchpad navigation device and the upper keybank boundary.

9. The keyboard of claim 8 and wherein:
   the scrolling wheel is laterally offset toward one of the first and second keybanks relative to a center of the touchpad navigation device.

10. The keyboard of claim 9 and further comprising:
    a depressible switch positioned within the central area, between the scrolling wheel and the other of the first and second keybanks.

11. The keyboard of claim 6 and further comprising:
    a depressible switch positioned below the lower keybank boundary.

12. The keyboard of claim 11 wherein the depressible switch is separated from the touchpad navigation device by 6–8 centimeters.

13. The keyboard of claim 11 wherein a center of the depressible switch is positioned along a natural arc of a thumb of a user's hand when an index finger of the user's hand is placed at a center of the touchpad navigation device, wherein a size of the user's hand falls within a range of a 5th percentile female to a 95th percentile male of North American adults.

14. The keyboard of claim 13 and further comprising a further depressible switch positioned below the lower keybank boundary and along the natural arc.

15. The keyboard of claim 6 wherein the touchpad navigation device is positioned relative to the first keybank such that a user's hand a size of the user's hand having a size falling within a range of a 5th percentile female to a 95th percentile male of North American adults is in a biomechanically neutral position when an index finger of the hand is touching a center of the touchpad navigation device and a middle finger of the hand is resting on the first keybank.

16. A keyboard comprising:
    first and second keybanks, which are laterally separated from one another and have upper and lower keybank boundaries;
    a central area between the first and second keybanks;
    a touchpad X-Y navigation device positioned within the central area, between the upper and lower keybank boundaries, and comprising a circular sensing window and a touch sensor, which is sensitive to placement of a user's digit within the sensing window; and
    a scrolling wheel positioned within the central area, between the X-Y navigation device and the upper keybank boundary, and laterally offset toward one of the first and second keybanks relative to a center of the X-Y navigation device.

17. The keyboard of claim 16 and further comprising:
    a center reference line extending through the central area, from the lower keybank boundary toward the upper keybank boundary and equidistant between the first and second keybanks; and
    wherein the X-Y navigation device is centered along the center reference line.

18. The keyboard of claim 16 and further comprising:
    a depressible switch positioned within the central area, between the scrolling wheel and the other of the first and second keybanks.

19. The keyboard of claim 16 and further comprising:
    a depressible switch positioned below the lower keybank boundary.

20. The keyboard of claim 16 and further comprising:
    a depressible switch positioned below the lower keybank boundary.

21. The keyboard of claim 20 wherein the depressible switch is separated from the X-Y navigation device by 6–8 centimeters.

22. The keyboard of claim 20 wherein a center of the depressible switch is positioned along a natural arc of a thumb of a user's hand when an index finger of the user's hand is placed at a center of the X-Y navigation device, wherein a size of the user's hand falls within a range of a 5th percentile female to a 95th percentile male of North American adults.

23. The keyboard of claim 22 and further comprising a further depressible switch positioned below the lower keybank boundary and along the natural arc.

24. The keyboard of claim 16 wherein the X-Y navigation device is positioned relative to the first keybank such that a user's hand a size of the user's hand having a size falling within a range of a 5th percentile female to a 95th percentile male of North American adults is in a biomechanically neutral position when an index finger of the hand is touching a center of the X-Y navigation device and a middle finger of the hand is resting on the first keybank.

25. A computer comprising:
    an electronics housing;
    a display coupled to the electronics housing; and
    a keyboard coupled to the electronics housing and comprising:
       first and second keybanks, which are laterally separated from one another and have upper and lower keybank boundaries;
       a central area between the first and second keybanks;
       a touchpad navigation device comprising a substantially circular sensing window and a touch sensor, which is sensitive to location of a user's digit relative to a perimeter of the sensing window, wherein the touchpad navigation device is positioned within the central area, between the upper and lower keybank boundaries; and an annular scrolling dial, which is coaxial with the circular sensing window and rotatable about a center of the sensing window.

26. The computer of claim 25 wherein the computer comprises a laptop computer, wherein the display and the keyboard are mechanically attached to the electronics housing.

27. The computer of claim 25 wherein the computer comprises a desktop computer, wherein the display and the keyboard are stand-alone devices.

28. A navigation input device for navigating a graphical display, the input device comprising:

a substantially circular sensing window having a perimeter;

an X-Y navigation touch sensor, which is sensitive to location of a user's digit within the substantially circular sensing window relative to the perimeter; and an annular scrolling dial, which is coaxial with the circular sensing window and rotatable about a center of the sensing window.

* * * * *